United States Patent [19]

Plummer

[11] 3,951,828

[45] Apr. 20, 1976

[54] PROCESS OF INJECTING A MICELLAR DISPERSION INTO A SUBTERRANEAN RESERVOIR

[75] Inventor: Mark A. Plummer, Littleton, Colo.

[73] Assignee: Marathon Oil Company, Findlay, Ohio

[22] Filed: Nov. 29, 1973

[21] Appl. No.: 420,027

[52] U.S. Cl. ............................ 252/8.55 B; 166/274; 166/275; 166/304; 252/8.3; 252/8.55 D
[51] Int. Cl.² .......................................... E21B 43/22
[58] Field of Search .......... 252/8.3, 8.55 B, 8.55 D; 166/273, 274, 275, 304

[56] References Cited
UNITED STATES PATENTS

| | | | |
|---|---|---|---|
| 2,364,222 | 12/1944 | Kaufman | 166/304 X |
| 3,163,214 | 12/1964 | Csaszar | 252/8.55 X |
| 3,536,136 | 10/1970 | Jones | 252/8.55 X |
| 3,664,419 | 5/1972 | Holm | 166/273 X |
| 3,682,249 | 8/1972 | Fischer et al. | 166/274 X |
| 3,830,301 | 8/1974 | Holm | 166/274 |

*Primary Examiner*—Herbert B. Guynn
*Attorney, Agent, or Firm*—Joseph C. Herring; Jack L. Hummel

[57] ABSTRACT

The injectivity of micellar dispersions containing wax within the hydrocarbon phase is improved by incorporating into this phase about 0.01–10 percent by weight of a low molecular weight paraffinic hydrocarbon. This invention is especially useful with micellar dispersions obtained from petroleum sulfonates that have been cooled, e.g. to about 40°F., and thereafter heated during injection into a subterranean reservoir for secondary or tertiary oil recovery purposes.

10 Claims, 1 Drawing Figure

PROCESS OF INJECTING A MICELLAR DISPERSION INTO A SUBTERRANEAN RESERVOIR

BACKGROUND OF THE INVENTION

1. Field of the Invention

This invention relates to improving the injectivity of a micellar dispersion containing wax in the hydrocarbon phase. Secondary and tertiary-type processes are applicable with this invention as well as stimulation techniques.

2. Description of the Prior Art.

Micellar dispersions are known in the art to be useful for stimulating wells (U.S. Pat. Nos. 3,467,188 to Gogarty and 3,467,194 to Kinney et al). These dispersions are also known to be useful in secondary and tertiary recovery processes, see U.S. Pat. Nos. 3,254,714 to Gogarty et al, 3,497,006 to Jones et al, and 3,506,071 to Jones. The micellar dispersions generally contain water, hydrocarbon, surfactant (preferably a petroleum sulfonate) and optionally cosurfactant (also identified as a cosolubilizer, semi-polar organic compound, etc.), and/or electrolyte. The micellar dispersion can be oil-external or water-external and can contain additives in addition to those mentioned above.

Pertinent patents in the art include:

U.S. Pat. No. 2,193,499 to Carr removes wax deposits from reservoirs by treating the reservoir with a composition containing calcium petroleum sulfonate and a branched chain paraffin.

U.S. Pat. No. 3,670,819 to Dauben stimulates water injection wells by treating the well with a micellar solution slug followed by a "primary" oil-external micellar solution (contains less water than the first micellar solution slug and can contain solvents such as kerosene, organic naphtha, ketone, or carbon disulfide) and this, in turn, followed by a micellar slug of increased water content.

U.S. Pat. No. 3,682,249 to Fischer et al teaches the inhibition of wax from a wax-containing micellar dispersion by incorporating therein about 5–10,000 ppm of a copolymer of ethylene and a monoethylenically unsaturated ester. The copolymer also improves the filterability and injectivity of the micellar dispersion in a porous media.

One of the problems with wax in the micellar dispersion is that once the micellar dispersion is cooled, e.g. in storage or while it is being pumped to the injection site, and then reheated for injection, the insoluble wax crystals that form during the cooling cycle tend to "block" or "plug" the subterranean reservoir rock as the dispersion is injected therein. These wax crystals do not immediately go back into solution when the micellar dispersion is heated. This adverse effect is apparent even if the micellar dispersion has been filtered at high or low temperatures prior to injection. Applicants' incorporation of the low molecular weight paraffin hydrocarbon into the micellar dispersion overcomes the adversity caused by the wax. As a result, the micellar dispersion can be subjected to cooling without experiencing adverse injectivity rates. That is, a micellar dispersion can be made up and filtered at relatively high temperatures, thereafter cooled to relatively cold temperatures as it is pumped to the well head, and then reheated to reservoir temperatures as it is pumped from the well head down to the reservoir rock without adverse injectivity problems. the low molecular weight paraffin can be added to the micellar dispersion before this cooling and heating cycle.

SUMMARY OF THE INVENTION

Applicant's invention is the incorporation into the micellar dispersion of about 0.1 to about 10 weight percent of a paraffinic hydrocarbon having an average molecular weight of about 50 to about 250. The dispersion generally contains about 0.005 to about 0.5 percent wax, this amount is sufficient to adversely influence the injectivity of the micellar dispersion and especially so where the micellar dispersion is cooled to temperatures that are below the temperature at which the wax tends to form "solid wax precipitates."

BRIEF DESCRIPTION OF THE DRAWING

The attached FIGURE represents the reciprocal mobility versus the pore volumes injected of identical micellar dispersions except they contain the following: the dispersion for Curve A contains no additive, the dispersion for Curve B contains 2 weight percent kerosene, the dispersion for Curve C contains 2 weight percent iso-octane, and the dispersion for Curve D contains 2 weight percent alkylate. As is evident from the curves, the dispersions represented by Curves B, C, and D have lower reciprocal mobilities at large pore volume injections than the dispersion for Curve A. The viscosities for these respective micellar dispersions are given in the legend.

The micellar dispersions contain an ammonium petroleum sulfonate obtained by sulfonating crude oil. Composition of the micellar dispersion containing no additive is as follows:

Figure 1:
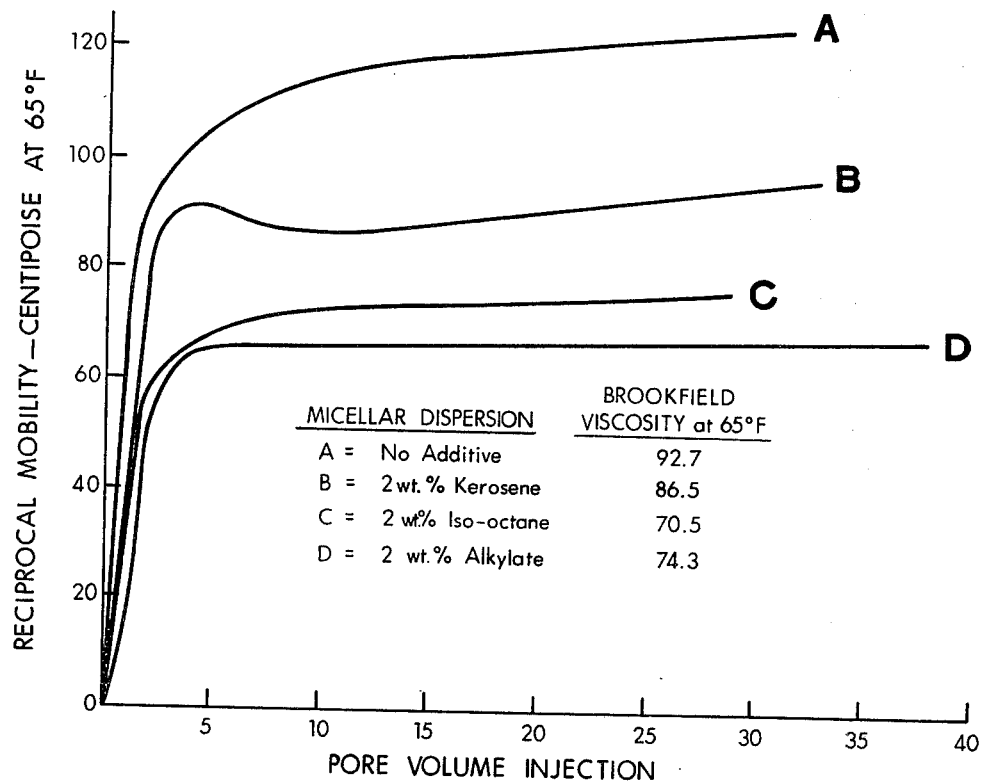

| Component | Weight Percent |
|---|---|
| $-SO_3NH_4$ | 3.5 |
| $(NH_4)_2SO_4$ | 3.8 |
| Unreacted hydrocarbon | 9.4 |
| Water | 71.8 |

Where an additive is added, e.g. 2 weight percent kerosene, the equivalent amount of water is removed from the dispersion. The average equivalent weight of the petroleum sulfonate is 418. To the micellar dispersion there is added 1.2–1.4 milliliters/100 grams of an alcohol containing 75 percent iso-butanol and 25 percent n-hexanol (percents based on volume).

The micellar dispersions are filtered through a diatomaceous earth filter medium at 70°–100°F. and the filtrate is cooled in a 50°F. bath for 1.5 hours and thereafter heated in a 65°F. bath for 1.5 hours. This time-temperature history represents conditions that the micellar dispersion is exposed to after filtration and before injection into the porous reservoir rock. The micellar dispersions are then passed through a reservoir core plug at 65°F. and the reciprocal mobility vs. the number of pore volumes injected into the core plug is plotted. At large pore volume injections, the reciprocal mobility should become essentially constant and essentially equal to the viscosity of the micellar dispersion if no reduced injectivity occurs. If injectivity reduction does occur, the reciprocal mobility should continue to increase as the number of pore volumes increases. As the data indicate, the micellar dispersion that contains no additive (Curve A), continues to plug the core as the number of pore volumes increases. With the micellar dispersions containing iso-octane and alkylate, the plugging effect is substantially reduced. The dispersion containing kerosene shows improvement over Curve A.

DESCRIPTION OF THE PREFERRED EMBODIMENTS

The micellar dispersion contains hydrocarbon, surfactant, water, and optionally cosurfactant (also identified as cosolubilizer, semi- polar organic compound, etc.) and/or electrolyte and/or other additives which impart desired properties. Components of the micellar dispersion are known in the art, e.g. see U.S. Pat. Nos. 3,254,714 to Gogarty et al; 3,275,075 to Gogarty et al; 3,497,006 to Jones et al; 3,506,070 and 3,506,071 to Jones; 3,474,865 to Gogarty et al; 3,467,188 to Gogarty; 3,373,809 to Cooke, Jr.; 3,697,424 to Holm; 3,714,062 to Askew; 3,500,919 to Holm; etc. The surfactant is preferably a petroleum sulfonate and more preferably a sulfonate obtained by sulfonating crude oil. The crude oil generally contains a certain amount of wax and a portion of this wax ends up in the micellar dispersion. The wax can also be attributed to wax within the hydrocarbon that is used to make up the micellar dispersion.

Wax is defined as the precipitate which forms after one part of the hydrocarbon portion of the micellar dispersion is dissolved in two parts of methyl-ethyl ketone at about 80°C. and the mixture chilled to about −25°C.

Weight percents of components within the micellar dispersion include about 1 to about 75 percent or more and preferably about 5 to about 15 percent of hydrocarbon, at least about 2.5 percent and preferably about 4.0 to about 25 percent and more preferably about 8 to about 16 percent of the surfactant, about 20 to about 95 percent and preferably about 65 to about 80 percent water, about 0.01 to about 20 percent cosurfactant, and about 0.001 percent to about 5 percent or more of the electrolyte. The surfactant can be a composition of unreacted hydrocarbon (also referred to as vehicle oil), salt, and preferably 25 percent and more preferably 50 percent or more of active surfactant.

This invention is particularly useful with micellar dispersions containing at least 0.005 percent of wax and preferably those containing about 0.01 to about 0.5 percent and more preferably about 0.05 to about 0.25 percent wax. This wax has an average molecular weight of about 240 to about 600.

The low molecular weight paraffins added to the micellar dispersion have an average molecular weight of about 50 to about 200 and preferably about 75 to about 150. These paraffins can be substituted with groups known in the art. Examples of useful paraffinic hydrocarbons include light straight run gasoline (100°–250°F. boiling range at 1 atmosphere), kerosene (300°–500°F. boiling range at 1 atmosphere), heavy naphtha (boiling range of about 200 to about 400 at 1 atmosphere), alkylate (average boiling range of 100 to about 425°F. at 1 atmosphere), pentane, hexane, butane, heptane, octane, etc. Of course, the isomers of the above hydrocarbons are also useful. The average boiling point ranges of useful paraffinic hydrocarbons can be defined as 100° to about 500°F. at one atmosphere.

The micellar dispersions are useful for stimulation of both production wells and injection wells, flooding operations for primary, secondary or tertiary processes, etc. For example, the micellar dispersion can be injected into the reservoir and followed by a mobility buffer slug (preferably water containing a high molecular weight polymer) and this, in turn, followed by a water drive to displace the previously two injected slugs toward a production well to recover crude oil therethrough. Of course, preslugs can be injected before the micellar dispersion to impart desired flooding properties. Also, the injected slugs can contain additives to reduce corrosion, prevent bacterial action on the fluids within the reservoir, etc.

EXAMPLES

The following examples present working embodiments of the invention. Unless otherwise specified, all percents are based on weight.

Micellar dispersions are obtained by blending an ammonium petroleum sulfonate (average equivalent weight 418, activity about 50 percent, unreacted hydrocarbon about 30 percent, wax about 0.25 percent) with water. Analysis of the micellar dispersion is given below:

| Component | Weight Percent |
|---|---|
| —SO$_3$NH$_4$ | 3.5 |
| (NH$_4$)$_2$SO$_4$ | 3.8 |
| Unreacted hydrocarbon | 9.4 |
| Water | 71.8 |

The ammonium petroleum sulfonate is obtained by sulfonating crude oil with SO$_3$ and thereafter neutralizing with ammonium hydroxide. The micellar dispersions are filtered through a diatomaceous earth filter at 70°–100°F. To the filtered micellar dispersion there is added 1.2–1.4 ml. of a cosurfactant (75 vol. percent isobutanol and 25 vol. percent n-hexanol) per 100 grams of the alcohol-free micellar dispersion. The dispersions are then cooled in a 50°F. bath for 1.5 hours and are thereafter heated in a 65°F. bath for 1.5 hours. This cooling and heating cycle simulates the time-temperature history that a typical micellar dispersion undergoes during reservoir injection in winter months. The micellar dispersions are then passed through reservoir core plugs 1 in. in diameter and 1 in. long; the core plugs have average permeabilities of about 100 to about 200 millidarcies. Reciprocal mobility is defined as core permeability $x$ pressure drop $x$ core area divided by (flow rate $x$ core length) and is essentially the effective viscosity of the micellar dispersion under flowing conditions in the core. Curves A-D have been explained earlier.

It is intended that all equivalents obvious to those skilled in the art be incorporated within the scope of the invention as defined within the specification and appended claims.

What is claimed is:

1. In a process of injecting a micellar dispersion into a subterranean reservoir wherein the micellar dispersion is comprised of a petroleum sulfonate surfactant, hydrocarbon and water in an amount of from about 20 to about 95 percent by weight and the dispersion contains sufficient amounts of wax having an average molecular weight of about 240 to about 600 to adversely influence the injectivity of the micellar dispersion into the reservoir, the improvement comprising incorporating about 0.1 to about 10 weight percent of a paraffinic hydrocarbon having an average molecular weight of about 50 to about 200 within the micellar dispersion and then injecting the dispersion into the reservoir.

2. The process of claim 1 wherein the average molecular weight of the paraffinic hydrocarbon is about 75 to about 150.

3. The process of claim 1 wherein the micellar dispersion contains about 0.005 to about 0.5 percent of wax.

4. The process of claim 1 wherein the petroleum sulfonate is obtained by sulfonating crude oil.

5. The process of claim 1 wherein about 0.5 to about 5 percent of the paraffinic hydrocarbon is incorporated into the micellar dispersion.

6. The process of claim 1 wherein the micellar dispersion contains about 1 to about 75 percent by weight of hydrocarbon and at least about 2.5 percent by weight of Petroleum sulfonate.

7. In a process of injecting a micellar dispersion into a subterranean reservoir wherein the dispersion is comprised of a petroleum sulfonate obtained by sulfonating whole crude oil, about 1 to about 75 percent by weight of hydrocarbon and water in an amount of from about 20 to about 95 percent by weight and the dispersion contains a sufficient amount of a wax (defined as the precipitate which forms after 1 part of the hydrocarbon within the micellar dispersion is dissolved in 2 parts of methylethyl ketone at about 80°C. and the mixture chilled to −25°C.) to adversely influence the injectivity of the micellar dispersion and wherein the micellar dispersion, before injection, is subjected to a reduction in temperature which results in the formation of wax particles causing the adverse injectivity, the improvement comprising incorporating into the micellar dispersion about 0.5 to about 5 weight percent of a paraffinic hydrocarbon having an average molecular weight of about 50 to about 200 and thereafter injecting the dispersion into the reservoir.

8. The process of claim 7 wherein the average molecular weight of the paraffinic hydrocarbon is about 75 to about 150.

9. The process of claim 7 wherein the wax concentration of the micellar dispersion is about 0.05 to about 0.25.

10. The process of claim 7 wherein the micellar dispersion contains about 5 to about 15 percent by weight of hydrocarbon, about 4 to about 25 percent by weight of petroleum sulfonate and about 65 to about 80 percent by weight of water.

\* \* \* \* \*

UNITED STATES PATENT OFFICE
CERTIFICATE OF CORRECTION

Patent No. 3,951,828                    Dated April 20, 1976

Inventor(s) Mark A. Plummer

It is certified that error appears in the above-identified patent and that said Letters Patent are hereby corrected as shown below:

Column 1, line 28:   Delete "2,193,499" and substitute therefor --3,193,499--

Column 1, line 68:   Delete "the" and substitute therefor --The--

Column 4, line 49:   Delete --( )-- around "flow rate x core length"

Signed and Sealed this

Fifth Day of June 1979

[SEAL]

Attest:

RUTH C. MASON
Attesting Officer

DONALD W. BANNER
Commissioner of Patents and Trademarks